United States Patent [19]

White et al.

[11] Patent Number: 5,427,726
[45] Date of Patent: Jun. 27, 1995

[54] PROCESS FOR RESIN TRANSFER MOLDING USING A PARTIALLY CURED TACKIFIER

[75] Inventors: Warren D. White, Lake Jackson, Tex.; Phil H. Cook; Martin Wai, both of Cheshire, Conn.; William Davis, Lake Jackson, Tex.

[73] Assignee: The Dow Chemical Company, Midland, Mich.

[21] Appl. No.: 349,108

[22] Filed: Dec. 2, 1994

Related U.S. Application Data

[63] Continuation of Ser. No. 77,466, Jun. 15, 1993, abandoned.

[51] Int. Cl.⁶ .............................................. B29C 70/48
[52] U.S. Cl. .................................... 264/137; 264/131; 264/257; 264/258
[58] Field of Search ............... 264/131, 135, 137, 257, 264/258, 325, 328.1; 156/308.2, 309.9; 427/386

[56] References Cited

U.S. PATENT DOCUMENTS

| | | | |
|---|---|---|---|
| 3,450,594 | 6/1969 | Hennessy | 156/307.1 |
| 3,922,418 | 11/1975 | Lauchenauer | 428/196 |
| 4,213,930 | 7/1980 | Goodrich et al. | 264/135 |
| 4,325,770 | 4/1982 | Korpman | 156/230 |
| 4,329,387 | 5/1982 | Goodrich et al. | 428/196 |
| 4,496,415 | 1/1985 | Sprengling | 156/283 |
| 4,664,768 | 5/1987 | Scala et al. | 156/307.4 |
| 4,952,366 | 8/1990 | Gelin | 264/137 |
| 4,988,469 | 1/1991 | Reavely et al. | 264/258 |
| 4,992,228 | 2/1991 | Heck et al. | 264/135 |
| 5,041,260 | 8/1991 | Johnson et al. | 264/257 |
| 5,064,705 | 11/1991 | Donovan, Sr. | 264/258 |
| 5,071,711 | 12/1991 | Heck et al. | 264/137 |
| 5,080,851 | 1/1992 | Flonc et al. | 264/258 |
| 5,156,786 | 10/1992 | Monroe | 264/258 |
| 5,192,387 | 3/1993 | Buckley | 264/325 |
| 5,204,033 | 4/1993 | Pearce et al. | 264/137 |
| 5,217,654 | 6/1993 | Buckley | 264/135 |
| 5,217,766 | 6/1993 | Flonc et al. | 428/156 |

FOREIGN PATENT DOCUMENTS

| | | |
|---|---|---|
| 53-143665 | 12/1978 | Japan . |
| 56-163173 | 12/1981 | Japan . |
| 59-008374 | 2/1984 | Japan . |
| 2158471 | 11/1985 | United Kingdom . |

OTHER PUBLICATIONS

White et al., U.S. patent application Ser. No. 08/059,153, filed May 7, 1993.
Derwent Publications, Ltd., Japan, A 5031 839, Tonen Corp., 9 Feb. 1993.

*Primary Examiner*—Jay H. Woo
*Assistant Examiner*—Robert B. Davis

[57] ABSTRACT

An improved process to make composites contains the steps of: (1) contacting a substrate with a thermoplastic partially-cured curable resin at above the glass-transition temperature to form a preform; (2) adding a matrix resin that can dissolve the tackifier and co-curing the tackifier and matrix resin to form a composite. The resulting composites are useful in structural applications.

18 Claims, No Drawings

PROCESS FOR RESIN TRANSFER MOLDING USING A PARTIALLY CURED TACKIFIER

CROSS-REFERENCE TO RELATED APPLICATION

This is a continuation of application Ser. No. 08/077,466, filed Jun. 15, 1993, and now abandoned.

BACKGROUND OF THE INVENTION

The present invention relates to resin transfer molding processes and preforms useful in those processes.

Resin transfer molding processes are used to make fiber reinforced composite materials. Layers of reinforcing material are loaded into a mold, and a thermosetting resin is injected into the mold and cured using accepted procedures to provide a finished composite piece.

It is difficult and time consuming to load individual layers of fiber into the mold. Therefore, a thermoplastic, thermosetting resin is sometimes used as a "tackifier" to stiffen the reinforcing materials and hold them together before the molding process begins. See Heck et al., U.S. Pat. No. 4,992,228 (Feb. 12, 1991) and Flonc et al., U.S. Pat. No. 5,080,851 (Jan. 14, 1992), which are incorporated herein by reference. In such a process, the individual fiber plies are sprinkled with a solid powder of the tackifier. The individual ply, with the powder applied, is heated to above the melting point of the tackifier in order to fuse the tackifier to the surface of the substrate.

In a separate operation, the individual plies can be stacked together, heated and pressed to fuse the plies together, and then cooled to solidify the tackifier leaving a preform. The preform can be placed into the mold and used in an ordinary resin transfer molding process thereafter.

SUMMARY OF THE INVENTION

The known processes have an unrecognized drawback. The tackifier is seldom completely soluble in the matrix resin used in the resin transfer molding process. The time needed for the matrix resin to dissolve the tackifier is often much longer than the time needed to complete the resin transfer molding process. Therefore, as curable resin is pumped into the mold, it transports the tackifier preferentially to one end of the molded product. The resulting composite product contains a matrix resin whose chemical composition is different at one end from the chemical composition at the other end. The end containing high concentrations of tackifier frequently has poorer physical properties (such as glass-transition temperature) and/or poorer mechanical properties (such as compression or short-beam shear strength) than the end that contains lower proportions of tackifier.

What is needed is an improved process which gives a substantially even dispersion of tackifier throughout the composite product.

One aspect of the present invention is a process to make a matrix composite comprising the steps of:

(1) contacting a reinforcing substrate with a thermoplastic-like tackifier at a temperature above the glass-transition temperature of the tackifier, so that the tackifier adheres to the substrate but remains thermoplastic and capable of further reaction, whereby a preform is made; and (2) contacting one or more preforms with a matrix resin, which is a second curable resin or resin composition in which the tackifier is soluble and which is capable of co-curing with the tackifier, under conditions such that the tackifier and matrix resin are cured, whereby a composite is formed.

(The term "thermoplastic-like" is a term of art referring to a solid, thermosetting resin that exhibits thermoplastic properties, such as a glass-transition temperature and/or a melting point, so that the resin is thermoformable. The glass-transition temperature or melting point should be low enough so that the thermoplastic-like resin cures slowly or not at all, so that the resin can be thermoformed without completely curing the resin.)

A second aspect of the present invention is a process to make a matrix composite comprising the steps of:

(1) contacting a reinforcing substrate with a thermoplastic-like tackifier at a temperature above the glass-transition temperature of the tackifier for a time chosen so that the tackifier adheres to the substrate but remains thermoplastic and capable of further reaction, whereby a preform is made; and (2) contacting one or more preforms with a matrix resin, which is a second curable resin or resin composition that is essentially identical to the first curable resin or resin composition and is capable of co-curing with the tackifier, under conditions such that the tackifier and matrix resin are cured, whereby a composite is formed.

The processes of the present invention can be used to make reinforced matrix composites. The composites are useful as structural materials.

DETAILED DESCRIPTION OF THE INVENTION

The present invention uses a reinforcing substrate. Suitable reinforcements are well known and familiar to persons of ordinary skill in the art. See, e.g., Kirk-Othmer Encyclopedia of Chemical Technology-Supplement, *Composites, High Performance*, at 260–281 (J. Wiley & Sons, 1984), which is incorporated herein by reference. The substrate usually contains fibers, such as quartz, aramid, boron, glass, carbon, or gel-spun polyethylene fibers. The fibers can be unidirectional or multidirectional. They may be in the form of woven or nonwoven mats or in the form of random short fibers. Preferably, the substrate is in the form of a woven or nonwoven fibrous material.

The substrate is contacted with a thermoplastic-like tackifier under conditions such that the tackifier partially melts and adheres to the substrate. The tackifier contains a thermoplastic-like curable resin or resin composition. Curable resins that are ordinarily liquid or semi-solid at room temperature can be converted to thermoplastic-like solid resins either by advancing the molecular weight of the resin (such as an advanced epoxy resin) or by partially curing the resin (such as; by partially polymerizing a bismaleimide resin) or both.

The resins usually fall into two groups: (1) resins that can completely cure by reacting with themselves without the need for a separate curing agent and (2) resins which require a curing agent for ordinary curing. (Each group contains some species; that also require the presence of an initiator, promoter or catalyst for optimal curing)

Examples of suitable resins which can cure or react with themselves include: polyimide and particularly bismaleimide resins, poly(cyanate ester) resins, polyester and vinyl ester resins (with suitable intiators and promoters) and benzocyclobutene resins. The most preferred example is bismaleimide resin. Examples of suitable polyimide and bismaleimide resins are described in Stenzenberger, "Recent Advances in Thermosetting Polyimides" 20 British Polymer Journal 383–396 (1988), which are incorporated herein by reference.

Examples of suitable resins that can react with themselves are commercially available. Examples of preferred bismaleimide resins include 4,4'-bismaleimidodiphenylmethane or 1,4-bismaleimido-2-methylbenzene or mixtures thereof, either alone or in mixtures with unsaturated monomers such as 0,0-diallyl-bisphenol A.

Examples of suitable resins that cure by reaction with a curing agent include: (a) a mix of epoxy resin and a known curing agent; (b) a mix of polyisocyanate and polyol suitable to make polyurethanes (such as SPECTRIM TM MM310 resin); and (c) epoxy-cyanate resin systems (such as E-905L resin from BP Chemicals). The mixture of resin and hardener preferably contains an epoxy resin and suitable curing agent.

The epoxy resin is preferably the glycidyl ether of a polyhydric phenol, such as biphenol, bisphenol A, tetrabromobisphenol A, a novolac resin (such as bicyclopentadienyl epoxy novolac), bis-(hydroxyphenyl)fluorene resin, or the like. It preferably has an epoxy equivalent weight (EEW) of between about 150 and 800. For instance, the resin may optionally be TACTIX ® 123, DER ® 383 or DER ® 542 epoxy resin from The Dow Chemical Company or PR-500 resin from 3M. In advanced thermoplastic-like resins, the EEW is preferably about 675–750. (Brominated resins, and other resins that contain a significant amount of heavy substituents, may have EEW that is about 50–100 or more higher than normal due to the presence of the heavier substituents.)

The curing agent for an epoxy resin is preferably an amine, amide, sulfimide, sulfamide, polyamine, polyamide, polymercaptan, polyphenol, polyacid, polyanhydride or a complex (such as a boron trifluoride:amine complex. For instance, the curing agent may optionally be MILLAMINE TM 5260 curing agent. It is more preferably an amine or amide compound, such as dicyanamide. A multistage curing agent, such as sulfanilamide, may also be used for making partially cured resin compositions. The multistage curing agent may be a single compound or a mixture of compounds that contain two or more reactive moieties that react with the epoxy resin to cure at different temperatures. The mixture of resin and curing agent may also contain a suitable curing catalyst, such as a primary aliphatic polyamine or a tertiary amine, phenol-containing tertiary amines or substituted imidazoles. Suitable catalysts, resins and hardeners are commercially available.

Preferably, the glass transition temperature of the tackifier is low enough that the preform can be laminated and/or shaped without over-curing the tackifier. An epoxy tackifier preferably has a glass transition temperature of no more than about 150° C., more preferably no more than about 130° C. and most preferably no more than about 100° C. A bismaleimide tackifier preferably has a glass transition temperature of no more than about 180° C., and more preferably no more than about 120° C. On the other hand, the glass transition temperature is preferably high enough so that the preform can be handled and stored at room temperature. The glass-transition temperature is preferably at least about 40° C., and more preferably at least about 60° C.

(Glass-transition temperature can be conveniently measured by differential scanning calorimetry.)

A tackifier that is liquid at room temperature may be advanced to higher molecular weight by known methods in order to create a solid thermoplastic resin. For instance, epoxy resins that are derived from bisphenols may be reacted with more bisphenol to advance molecular weight, according to known procedures. Solid advanced epoxy resins are commercially available and well known in the art. The preferred EEW of the advanced resin is previously described.

Furthermore, a tackifier that is ordinarily liquid may be partially cured to increase its molecular weight, so that it is thermoplastic-like. The partial curing may be accomplished in situ on the substrate, but is preferably done separately before the tackifier is applied to the substrate. It should be cured enough so that it solidifies at room temperature to adhere to the substrate and hold the substrate in the desired shape and position. On the other hand, the curing should not be complete. The partially cured tackifier should still be thermoformable and should still be capable of reacting with the matrix resin.

Curing can be halted at the desired level of curing by at least three different methods. First, a resin composition that contains both resin and a curing agent may contain less than a stoichiometric quantity of curing agent, so that only an incomplete cure is possible. The precise quantities of resin and curing agent vary depending upon the resin and curing agent selected, but can readily be determined by persons of ordinary skill in the art. For instance, when the resin is epoxy resin, and the curing agent is sulfanilamide, then the molar ratio of epoxy moieties to curing sites is preferably between 0.5:1 and 0.8:1 or 1.1:1 and 1.5:1.

Second, when resin composition contains both resin and a curing agent, the curing agent may be a multistage curing agent. The resin and curing agent are cured at a temperature that will only cause curing on some of the curing agent's active sites. In the second step, the composition may be cured at a higher temperature to cause curing at all of the active sites and completely cure the composition.

Third, even when the tackifier is self-curing or contains stoichiometric ratios of resin and hardener, the time and temperature of the partial cure may be selected to provide the desired level of curing. Again, the optimal time and temperature will vary depending upon the tackifier and the presence or absence of any catalyst within the tackifier. Persons of ordinary skill in the art can readily determine the optimum time and temperature without undue experimentation. For instance, when the tackifier contains a mixture of 4,4'-bis-MDA bismaleimide resin, 0,0'-diallyl-bisphenol A and higher molecular weight BMI compounds, it is preferably reacted for between 80 and 200 minutes at a temperature between about 110° C. and 150° C.

The tackifier is contacted with a reinforcing substrate at a temperature above its glass-transition temperature. The tackifier should be applied to the substrate in a quantity great enough to hold the fibers in the desired shape and position but small enough to leave the resulting preform porous, so that later the matrix resin can infuse throughout the substrate and eliminate any significant voids. The quantity of tackifier is preferably at least about 0.25 weight percent of the substrate, more preferably at least about 1 weight percent, and most preferably at least about 3 weight percent. The quantity of tackifier is preferably no more than about 15 weight percent of the substrate, more preferably no more than about 8 weight percent, and most preferably no more that about 5 weight percent.

The tackifier may be applied by known methods for powders, such as hand-sprinkling, spraying or electrostatic application. It is preferably applied substantially evenly across the substrate.

The temperature during or after application is raised high enough so that the tackifier becomes plastic and adheres to the fibers. The temperature should be low enough so that the tackifier does not complete curing if a hardener is present. It should remain thermoplastic, capable of later dissolving in the matrix resin and capable of co-curing with the matrix resin. A temperature within the glass-transition temperatures that were previously described is preferable.

Some partially cured tackifiers may continue to cure slowly at room temperature. Therefore, the preform is preferably used in the next step of the reaction before the tackifier cures significantly more. The tackifier is preferably shelf stable for at least about two weeks and more preferably for at least about a month.

Individual plies of preform may optionally be shaped or laminated together before the matrix resin is applied and cured.. For instance, multiple plies may be pressed together at a temperature above the glass transition temperature of the tackifier which does not completely cure the tackifier (such as a temperature within the glass-transition temperatures previously described). Likewise, individual preforms or laminates may be molded or shaped at a temperature above the glass transition temperature of the tackifier using pressure (such as 10 psi to 500 psi). Examples of shaping and laminating different preforms are described in Heck, U.S. Pat. No. 4,992,228 (Feb. 12, 1991) and Flonc, U.S. Pat. No. 5,080,851 (Jan. 14, 1992), which are incorporated herein by reference.

Optionally, the lamination or molding step may be combined with .step (1) in which the tackifier is adhered to the fibers. For instance, a powdered tackifier may be applied to substrates, arid then the substrates may be heated and pressed in order to simultaneously adhere the tackifier to the substrates and laminate the substrates together in a preform.

The preform is contacted with a matrix resin that contains a second curable resin or resin composition. The matrix resins have the same description and preferred embodiments previously given for tackifiers, except that at least a stoichiometric quantity of curing agent should be used. The matrix resin should be capable of reacting with the partially cured tackifier in the preform. The matrix resin should also be capable of dissolving the tackifier. Preferably, the quantity of matrix resin used in the composite is capable of dissolving the quantity of tackifier used in the composite under process temperatures. Preferably, the matrix resin can dissolve at least about 7 parts tackifier per 100 parts matrix resin (PPHR), more preferably at least about 10 PPHR, and most preferably at least about 15 PPHR. At about resin transfer molding temperatures, it preferably dissolves the tackifier in no more than about 30 minutes, more preferably in no more than about 20 minutes, and most preferably in no more than about 10 minutes.

The matrix resin is preferably chemically related to the tackifier, such as epoxy tackifiers with epoxy matrix resins or bismaleimide tackifiers with bismaleimide matrix resins. Preferably, at least about 50 percent of the backbone units in the tackifier and the matrix resin are the same; more preferably at least about 75 percent are the same; and most preferably essentially all are the same. Preferably, the curing agents and the ratio of curing agent to resin is about the same.

Most preferably, the matrix resin is essentially identical to the tackifier, so that the two resins cure to provide essentially equivalent cured polymers. For instance, the tackifier and the matrix resin:

(a) preferably contain essentially the same reactive sites, both in the resin and in the curing agent (if any);

(b) preferably have in common at least about 50 percent of backbone units that link the reactive sites, more preferably at least about 80 or 90 percent, and most preferably essentially all;

(c) preferably have weight average molecular weights that differ from each other by no more than about a 1:10 ratio, more preferably no more than about a 1:5 ratio and most preferably no more than about a 1:3 ratio; and (d) preferably have average equivalent weights that differ from each other by no more than about a 1:10 ratio, more preferably no more than about a 1:5 ratio and most preferably no more than about a 1:3 ratio.

The quantity of matrix resin should be sufficient to hold the fibers together, to maintain fiber alignment and, preferably, to transfer loads around broken fibers. It is usually preferable to minimize the quantity of matrix resin in the composite. After curing, the matrix resin and tackifier usually make up at least about 20 volume percent of the composite and most often at least about 35 volume percent. It is preferably no more than about 80 volume percent of the composite, more preferably no more than about 50 volume percent and most preferably no more than about 40 volume percent.

The matrix resin is preferably applied under sufficient pressure to force it throughout the preform, so that voids within the cured composite are minimized. The matrix resin is preferably applied at pressures of about full vacuum ($-14.7$ psig) to 600 psi, and more preferably at 50 to 400 psi. The cured composite preferably contains no more than about 5 volume percent voids, and more preferably no more than about 2 volume percent.

The matrix resin and tackifier are then subjected to temperature and other conditions suitable to fully cure them. Again, the optimum time and temperature varies widely depending upon the matrix resin and tackifier used. When the matrix resin and tackifier are epoxy resins, then the final curing step is preferably at least about 20 to 120 minutes at a temperature of at least about 90° C. to 180° C. When the matrix resin and tackifier are bismaleimide resins, then the final curing step is preferably at least about 60 to 360 minutes at a temperature of at least about 150° C. to 210° C. The final curing step is preferably completed in a mold that can provide a composite of the desired shape. The pressure in the mold is preferably between $-14.7$ psig and 500 psig, and more preferably between 50 psig and 400 psig.

The resulting cured composite can be cooled, finished and used in the ordinary manner for matrix composites.

It is theorized, without intending to be bound, that the tackifier remains evenly dispersed across the substrate because it dissolves evenly during the second step prior to curing, rather than remaining in discrete lumps.

Therefore, i the flow of matrix resin through the mold does not significantly move the tackifier. The effectiveness of this procedure can readily be verified by labeling the tackifier with a chemical label that can quantitatively be detected using nondestructive methods. For instance, a small amount of brominated epoxy resin can be made a part of the tackifier. That resin can be quantitatively analyzed without destroying the resulting composite part by x-ray fluorescence. The concentration of tackifier preferably varies across the face of the substrate on average by no more than about 5 percent and more preferably by no more than about 1 percent.

When the tackifier and matrix resin are essentially identical, it is theorized that further advantages are realized. It is irrelevant whether the tackifier completely dissolves in the matrix. Both the tackifier and the matrix resin co-cure to leave indistinguishable cured resins. Therefore, the composite does not contain inhomogeneous zones.

SPECIFIC EXAMPLES

The following examples are for illustrative purposes only they should not be taken as limiting the scope of either the specification or the claims. Unless otherwise stated all parts and percentages are by weight.

Example 1 - Synthesis of composite using epoxy matrix resin and preform that contains brominated epoxy resin tackifier Tackifier B is made by the following process: 500 g of the diglycidyl ether of brominated bisphenol A (commercially available as DER® 542 from The Dow Chemical Company) is heated under nitrogen purge to 110° C. with stirring from 60° C. on A 67 g quantity of tetrabromobisphenol A is added and dissolved. A 0.62 g quantity of ethyltriphenylphosphonium acetate-acetic acid complex is added dropwise. The temperature rises exothermically to about 140° C. The reaction temperature is maintained at about 135° C. to 140° C. until an hour after the exotherm has subsided.

The solubility of Tackifier B is tested in a diglycidyl ether of bisphenol A that has an epoxy equivalent weight (EEW) of 176–183. (Resin A) Weighed samples of Tackifier B were were placed in a beaker and heated to a desired temperature. Weighed samples of resin A, ground to a 100 mesh granule, were added to the beaker and stirred until a transparent solution was observed. The results are set out in Table 1-A.

Tackifier B is cryogenically ground to 100 mesh fineness.

An eight ply preform is made made using Tackifier B. An even coat of ground tackifier is sprinkled on each of 8 plies of carbon fiber reinforcing fabric (8 inches by 8 inches in dimension). The amount of tackifier is equal to about 5 percent of the weight of the fabric. The plies are placed in a 93° C. circulating air oven for 1 minute to adhere the resin to the fabric. The plies are then stacked, heated at 93° C. in a vacuum bag apparatus under 14.7 psi pressure for 30 minutes,

TABLE 1-A

| Concentration (PPHR) | Temperature (°C.) | Dissolution Time (min.) |
|---|---|---|
| 4 | 60 | 17 |
| 4 | 71 | 10 |
| 4 | 82 | 5 |
| 8 | 71 | 11 | and cooled to ambient temperature under reduced pressure. The resulting preform is about 0.15 in. thick.

The preform is placed in a mold and heated to 60° C. A mixture of 1100 g of resin A and 192.5 g diaminocyclohexane is injected into the mold at 60 psi until the mixture is seen exiting from exit holes in the mold. The mold temperature is increased to 177° C. at 2° C. per minute and held at 177° C. for 30 minutes to cure. The mold is cooled and the composite samples are recovered.

Example 2 - Production of Composites Using Other Epoxy Tackifiers

The procedure in Example 1 is repeated using Tackifiers C and G. Tackifier C is made by reacting 356 g of diglycidyl ether of bisphenol A (having an EEW of 176–183) with 132 g of epoxy-grade bisphenol A using 0.57 g of ethyltriphenylphosphonium acetate:acetic acid complex catalyst.

Tackifier G is made by reacting:
(a) 64.2 parts bicyclopentadienyl epoxy novolac with an EEW of 215–235;
(b) 17.81 parts epoxy novolac with an EEW of 176–181;
(c) 15.5 parts tetrabromobisphenol A; and
(d) 2.5 parts sulfanillic acid curing agent
at 150° C. for about 4 hours. The reaction product is broken into flakes; and passed through an 85° C. extruder at a rate of 9.6 l. lbs per hour, along with 0.6 lbs/hr of an equimolar mixture of fluoroboric acid and tetra-n-butylphosphonium acetate:acetic acid complex.

The solubility of each Tackifier in resin A is set out in Table 2-A:

TABLE 2-A

| Concentration (PPHR) | Temperature (°C.) | Dissolution Time for Tackifier C (min.) | Dissolution Time for Tackifier G (min.) |
|---|---|---|---|
| 4 | 60 | 33 | 24 |
| 4 | 71 | 16 | 16 |
| 4 | 82 | 9 | 10 |
| 8 | 71 | 24 | 17 |

Preforms and composites are made as described in Example 1. Composites are recovered.

Example 3 - Production of Composites Using Bismaleimide Tackifier and Resin

Tackifier K is made by the following procedure: 1000 g of a bismaleimide resin formulation that is commercially available from BASF Narmco as 5250-4-RTM (Resin J) is heated in an oven at 110° C. for one hour. (The formulation is believed to contain 4,4'-bis-maleimidodiphenylmethane; 0,0'-diallyl-bisphenol A; 1,4-bismaleimido-2-methylbenzene). Stirring is commenced and the resin is heated with infrared lamps according to the profile in Table 3-A. The reaction is stopped and quenched when the viscosity of the resin at 150° C. reaches about 2000 cps.

TABLE 3-A

| Time (min.) | Temperature (°C.) | Viscosity of Resin at 150° C. (cps) |
|---|---|---|
| 0 | 78 | — |
| 10 | 99 | — |
| 20 | 125 | — |
| 30 | 140 | — |
| 40 | 140 | <10 |
| 50 | 140 | 30 |
| 60 | 140 | 50 |
| 70 | 140 | 78 |
| 100 | 140 | 242 |

TABLE 3-A-continued

| Time (min.) | Temperature (°C.) | Viscosity of Resin at 150° C. (cps) |
|---|---|---|
| 120 | 141 | 546 |
| 140 | 139 | 1021 |
| 147 | 141 | 1621 |
| 151 | 140 | 2173 |

The tackifier is ground to 100 mesh size. An 8-ply preform is made as described in Example 1. A composite is made as described in Example 1, except that the matrix resin is Resin J and the composite is cured at about 205° C.

Example 4 - Production of Composites using Unsaturated Ester Tackifier and Resin A preform is made as described in Example 1 using as a tackifier a pentaerythritol ester of tall oil resin that is commercially available from Union Camp Co. as UNI-TAC R100. The preform is placed in a mold at about room temperature, and DERAKANE ™ 510C-350 vinyl ester resin is injected into the mold in a mixture with about 1 percent peroxide free radical initiator. The mold is heated to about 175° C. for about 30 minutes and a composite article is made.

What is claimed is:

1. A process to make a matrix composite comprising the steps of:
   (1) partially curing a first curable resin in the presence of a catalytic amount of curing catalyst and, if needed, a curing agent, whereby thermoplastic-like tackifier is romped which is capable of further curing and which has a glass-transition temperature of at least 30° C.;
   (2) contacting a reinforcing substrate with about 0.25 to about 15 weight percent of the tackifier from Step (1) at a temperature above the glass-transition temperature of the tackifier but below the temperature at which the tackifier fully cures, so that the tackifier adheres to the substrate, whereby a preform is made;
   (3) placing one or more preforms from step (2) into a mold; and
   (4) injecting a second curable resin or resin composition into the mold and curing the first and second curable resins or resin compositions together to form a matrix composite,
wherein the first and second curable resin or resin composition are selected such that either: (a) the second curable resin or resin composition is capable of dissolving at least about 7 parts tackifier per 100 parts matrix resin, by weight, at curing temperature in no more than about 30 minutes; or (b) the first curable resin and the second curable resin contain essentially identical reactive sites, and their equivalent weights differ by no more than about a 5:1 ratio.

2. The process of claim 1 wherein the first curable resin is a resin that cures without the need for a separate curing agent.

3. The process of claim 2 wherein the first curable resin is a bismaleimide resin.

4. The process of claim 3 wherein the bismaleimide resin contains 4,4'-bismaleimido-diphenylmethane or 1,4-bismaleimido-2-methylbenzene or mixtures thereof.

5. The process of claim 1 wherein the tackifier contains a curable resin and a hardener.

6. The process of claim 5 wherein the resin is an epoxy resin and the hardener is a suitable curing agent.

7. The process of claim 6 wherein the matrix resin also comprises an epoxy resin and a curing agent, and the curing agent in the matrix resin contains reactive groups which are essentially identical to the curing agent used to make the tackifier.

8. The process of claim 5 wherein the tackifier contains a stoichiometric excess of curable resin.

9. The process of claim 1 wherein the tackifier in the preform has a glass-transition temperature between about 40° C. and about 150° C.

10. The process of claim 1 wherein the ratio of tackifier to substrate in the preform is between about 1 and about 8 weight percent.

11. The process of claim 1 which further comprises the following step that is carried out between steps (1) and (2):
    (1a) pressing two or more preforms together at a temperature above the glass transition temperature of the tackifier at a pressure and for a time sufficient to laminate the preforms together.

12. The process of claim 1 which further comprises the following step that is carried out between steps (1) and (2):
    (1a) molding the preform at a temperature above the glass transition temperature of the tackifier at a pressure and for a time sufficient to shape the preform into a desired shape.

13. The process of claim 1 wherein the total quantity of cured matrix resin and tackifier within the finished composite is between about 20 and 80 volume percent.

14. The process of claim 1 wherein the finished composite contains no more than about 5 volume percent voids.

15. The process of claim 1 wherein the matrix selected can dissolve at least about 10 PPHR tackifier in no more than 20 minutes under curing temperatures.

16. The process of claim 1 wherein the first curable resin and the second curable resin contain essentially identical reactive sites, and their equivalent weights differ by no more than about a 5:1 ratio.

17. The process of claim 16 wherein tackifier and the second curable resin have average equivalent weights that differ from each other by no more than about a 3:1 ratio.

18. The process of claim 17 wherein the tackifier and matrix resin each contain an epoxy resin, and the hardeners which react with each epoxy resin contain essentially the same reactive groups.

* * * * *